United States Patent
Hu et al.

(10) Patent No.: US 11,882,026 B2
(45) Date of Patent: *Jan. 23, 2024

(54) METHOD AND NODE FOR PACKET TRANSMISSION IN NETWORK

(71) Applicant: Huawei Technologies Co., Ltd., Shenzhen (CN)

(72) Inventors: Zhibo Hu, Beijing (CN); Peng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,865

(22) Filed: Apr. 26, 2022

(65) Prior Publication Data

US 2022/0255851 A1 Aug. 11, 2022

Related U.S. Application Data

(63) Continuation of application No. 16/906,859, filed on Jun. 19, 2020, now Pat. No. 11,336,565, which is a
(Continued)

(30) Foreign Application Priority Data

Dec. 22, 2017 (CN) .......................... 201711408028.9

(51) Int. Cl.
*H04L 45/28* (2022.01)
*H04L 45/02* (2022.01)
(Continued)

(52) U.S. Cl.
CPC .............. *H04L 45/28* (2013.01); *H04L 45/04* (2013.01); *H04L 45/12* (2013.01); *H04L 45/18* (2013.01);
(Continued)

(58) Field of Classification Search
None
See application file for complete search history.

(56) References Cited

U.S. PATENT DOCUMENTS 10,069,725 B1 * 9/2018 Talur ...................... H04L 45/021
11,336,565 B2 * 5/2022 Hu .......................... H04L 45/04
(Continued)

FOREIGN PATENT DOCUMENTS

CN 102972009 A 3/2013
CN 108337157 A 7/2018
(Continued)

OTHER PUBLICATIONS

Shand, M., et al., "IP Fast Reroute Framework," RFC 5714, Jan. 2010, 15 pages.
(Continued)

*Primary Examiner* — Xavier S Wong
(74) *Attorney, Agent, or Firm* — Conley Rose, P.C.

(57) ABSTRACT

A method for packet transmission in a network includes receiving, by a first node, a second segment identifier sent by the third node, receiving, by the first node, a packet sent by the second node through the first path, determining, by the first node, that a next-hop node of the first node on the first path is faulty, and in response to the determining, by the first node, that a next-hop node of the first node on the first path is faulty, adding, by the first node, the second segment identifier to the packet, and sending the packet to the third node through a second path, where the second path is established by the first node based on the second segment identifier.

20 Claims, 5 Drawing Sheets

Related U.S. Application Data continuation of application No. PCT/CN2018/117365, filed on Nov. 26, 2018.

(51) Int. Cl.
*H04L 45/12* (2022.01)
*H04L 45/18* (2022.01)
*H04L 45/00* (2022.01)
*H04L 101/659* (2022.01)

(52) U.S. Cl.
CPC ........ *H04L 45/22* (2013.01); *H04L 2101/659* (2022.05)

(56) References Cited

U.S. PATENT DOCUMENTS

| | | | |
|---|---|---|---|
| 2001/0005358 A1 | 6/2001 | Shiozawa | |
| 2012/0005371 A1 | 1/2012 | Ravindran et al. | |
| 2013/0077475 A1 | 3/2013 | Enyedi et al. | |
| 2013/0077476 A1 | 3/2013 | Enyedi et al. | |
| 2014/0169370 A1* | 6/2014 | Filsfils | H04L 45/03 370/392 |
| 2016/0366052 A1* | 12/2016 | Chapman | H04L 45/66 |
| 2017/0346718 A1 | 11/2017 | Psenak et al. | |
| 2018/0077051 A1 | 3/2018 | Nainar et al. | |
| 2018/0375684 A1 | 12/2018 | Filsfils et al. | |
| 2018/0375763 A1 | 12/2018 | Brissette et al. | |
| 2018/0375968 A1* | 12/2018 | Bashandy | H04L 69/324 |
| 2022/0417137 A1* | 12/2022 | Filsfils | H04L 43/106 |

FOREIGN PATENT DOCUMENTS

| | | |
|---|---|---|
| JP | 2001186178 A | 7/2001 |
| JP | 2011155610 A | 8/2011 |
| WO | 2011055273 A1 | 5/2011 |

OTHER PUBLICATIONS

Bashandy, A., "Topology Independent Fast Reroute using Segment Routing," draft-bashandy-rtgwg-segment-routing-ti-lfa-01, Jul. 17, 2017, 12 pages.

Leymann, N., et al., "Huawei's GRE Tunnel Bonding Protocol," May 2017, RFC 8157, 44 pages.

Litkowski, S., et al, "Implementing non protected paths using SPRING," draft-litkowski-spring-non-protected-paths-02, Aug. 9, 2017, 14 pages.

Previdi S et al, "IS-IS Extensions for Segment Routing," draft-ietf-isis-segment-routing-extensions-10.txt, XP015118140, Feb. 27, 2017, 41 pages.

\* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |      Flag     |    SID-size   |
+-+-+-+-+-+-+-+-+-+-+-+-+-+-+-+-+-+-+-+-+-+-+-+-+-+-+-+-+-+-+-+-+
|                        SID (variable)...                      |
+-+-+-+-+-+-+-+-+-+-+-+-+-+-+-+-+-+-+-+-+-+-+-+-+-+-+-+-+-+-+-+-+
|   sub-tlv-len  |              Sub-TLVs (variable)...          |
+-+-+-+-+-+-+-+-+-+-+-+-+-+-+-+-+-+-+-+-+-+-+-+-+-+-+-+-+-+-+-+-+
```

FIG. 4

```
 0 1 2 3 4 5 6 7
+-+-+-+-+-+-+-+-+
|D|  Reserved   |
+-+-+-+-+-+-+-+-+
```

FIG. 5

METHOD AND NODE FOR PACKET TRANSMISSION IN NETWORK

CROSS-REFERENCE TO RELATED APPLICATIONS

This is a continuation of U.S. Pat. App. Ser. No. 16/906,859 filed on Jun. 19, 2020, which is a continuation of Int'l Patent App. No. PCT/CN2018/117365 filed on Nov. 26, 2018, which claims priority to Chinese Patent App. No. 201711408028.9 filed on Dec. 22, 2017, all of which are incorporated by reference in their entireties.

TECHNICAL FIELD

The present disclosure relates to the field of communications technologies, and in particular, to a method and a node for packet transmission in a network.

BACKGROUND

Based on an interior gateway protocol (IGP) fast reroute (FRR) technology, when a node on a primary path detects that a next-hop node of the node is faulty, a secondary path to a target node is computed according to a topology-independent loop-free alternate (TI-LFA) FRR, and the node continues to forward a packet using a next-hop on the secondary path, to ensure packet forwarding with high reliability. However, computation of the secondary path based on the IGP FRR technology is performed based on an assumption that the packet is forwarded according to an IGP shortest path first (SPF) principle. In this case, if a local forwarding policy, for example, a traffic engineering (TE) tunnel policy or policy-based routing is configured on a node on the secondary path, a traffic forwarding path is redefined using these local policies. Consequently, a packet forwarding loop is formed when a conflict occurs between the local policies and the IGP FRR during path computation. Further, normal forwarding of the packet is affected, and the FRR technology cannot be deployed.

SUMMARY

Embodiments of this application provide a method and a node for packet transmission in a network. In this way, a packet carrying a segment identifier is transmitted, and a loop is avoided in a packet forwarding process.

According to a first aspect, this application provides a method for packet transmission in a network, and the network includes a first node, a second node, and a third node. A first path from the second node to the third node is established in the network, the first path is established based on a first segment identifier of the third node, and the first node is on the first path. The method includes receiving, by the first node, a second segment identifier that is of the third node and that is sent by the third node, receiving, by the first node, a packet sent by the second node through the first path, where an address of the packet is a segment identifier of a next-hop node of the first node, determining, by the first node, that the next-hop node of the first node on the first path is faulty, and in response to the determining, by the first node, that the next-hop node of the first node is faulty, adding, by the first node, the second segment identifier to the packet, and sending the packet to the third node through a second path, where the second path is established by the first node based on the second segment identifier.

According to the method, the first node in the network may establish, based on the first segment identifier of the third node, a primary path for sending the packet, and when a node on the primary path for sending the packet is faulty, a previous-hop node in the network in which a fault occurs, for example, the first node, may establish a secondary path based on the second segment identifier of the third node in the network to continue to send the packet. In this way, normal forwarding of the packet is ensured, and a loop is avoided in a packet forwarding process.

In a possible implementation, the second path is established by the first node when the first node determines that the next-hop node of the first node on the first path is faulty, or the second path is established by the first node before the first node determines that the next-hop node of the first node on the first path is faulty.

According to the foregoing method, the second path is established only when the first node determines that the next-hop node of the first node is faulty, and the first node does not need to establish the second path in advance such that less resources of the first node can be wasted.

In a possible implementation, the adding, by the first node, the second segment identifier to the packet includes replacing, by the first node, a destination address of the packet with the second segment identifier.

In the foregoing method, the first node may send the packet to the third node based on the address of the packet.

In a possible implementation, the second segment identifier includes a path computation identifier, and the path computation identifier is used to instruct the first node to establish the second path according to a strict SPF algorithm.

According to the foregoing method, the second segment identifier includes the path computation identifier such that the packet is forwarded according to the SPF algorithm without using a local policy. Therefore, a loop is avoided during packet forwarding.

In a possible implementation, the first segment identifier and the second segment identifier are Internet Protocol version 6 (IPv6) addresses of the third node.

According to a second aspect, this application provides a first node for packet transmission in a network, and the first node performs the method in the first aspect or any one of the possible implementations of the first aspect. The node includes units configured to perform the method in the first aspect or any one of the possible implementations of the first aspect.

According to a third aspect, this application provides a system for packet transmission in a network, and the system includes a first node, a second node, and a third node. A first path from the second node to the third node is established in the network, the first path is established based on a first segment identifier of the third node, and the first node is on the first path. The system includes.

The first node is configured to receive a second segment identifier that is of the third node and that is sent by the third node, and is further configured to receive a packet sent by the second node through the first path. The first node is further configured to determine that a next-hop node of the first node on the first path is faulty, and in response to that the first node determines that a next-hop node of the first node on the first path is faulty, add the second segment identifier to the packet, establish a second path based on the second segment identifier, and send the packet to the third node through the second path. An address of the packet is a segment identifier of the next-hop segment node of the first node.

The second node is configured to receive the first segment identifier of the third node, establish the first path from the second node to the third node based on the first segment identifier, and send the packet to the first node through the first path.

The third node is configured to send the second segment identifier to the first node, send the first segment identifier to the second node, and receive the packet sent by the first node through the second path.

With reference to the third aspect, in a first possible implementation, the second segment identifier includes a path computation identifier, and the path computation identifier is used to instruct the first node to establish the second path according to a SPF algorithm.

According to a fourth aspect, this application provides a computer readable storage medium. The computer readable storage medium stores an instruction, and when the instruction is run on a computer, the computer is enabled to perform the method according to the first aspect and the possible implementations.

According to a fifth aspect, this application provides a network device. The network device includes a network interface, a processor, a memory, and a bus used to connect the network interface, the processor, and the memory. The memory is configured to store a program, an instruction, or code. The processor is configured to execute the program, the instruction, or the code in the memory, to complete the method according to the first aspect and the possible implementations.

BRIEF DESCRIPTION OF DRAWINGS

FIG. 4 is a schematic diagram of a packet format according to an embodiment of the present disclosure.

FIG. 5 is a schematic diagram of another packet format according to an embodiment of the present disclosure.

DESCRIPTION OF EMBODIMENTS

The following describes embodiments of the present disclosure with reference to accompanying drawings.

In the specification, claims, and the accompanying drawings of the present disclosure, the terms "first", "second", and so on are intended to distinguish between similar objects but do not necessarily indicate a specific order or sequence. It should be understood that data used in such a way may be changed in a proper circumstance such that the embodiments described herein can be implemented in other orders than the order illustrated or described herein. In addition, the terms "include", "have", and any other variants thereof are intended to cover non-exclusive inclusion. For example, a process, method, system, product, or device that includes a list of steps or units is not necessarily limited to those expressly listed steps or units, but may include other steps or units that are not expressly listed or inherent to such a process, method, product, or device.

The "node" in the embodiments of this application may be a device that forwards service traffic. For example, the "node" may be a router, a switch, an Optical Transport Network (OTN) device, a Packet Transport Network (PTN) device, or a wavelength division multiplexing (WDM) device.

Figure 1:
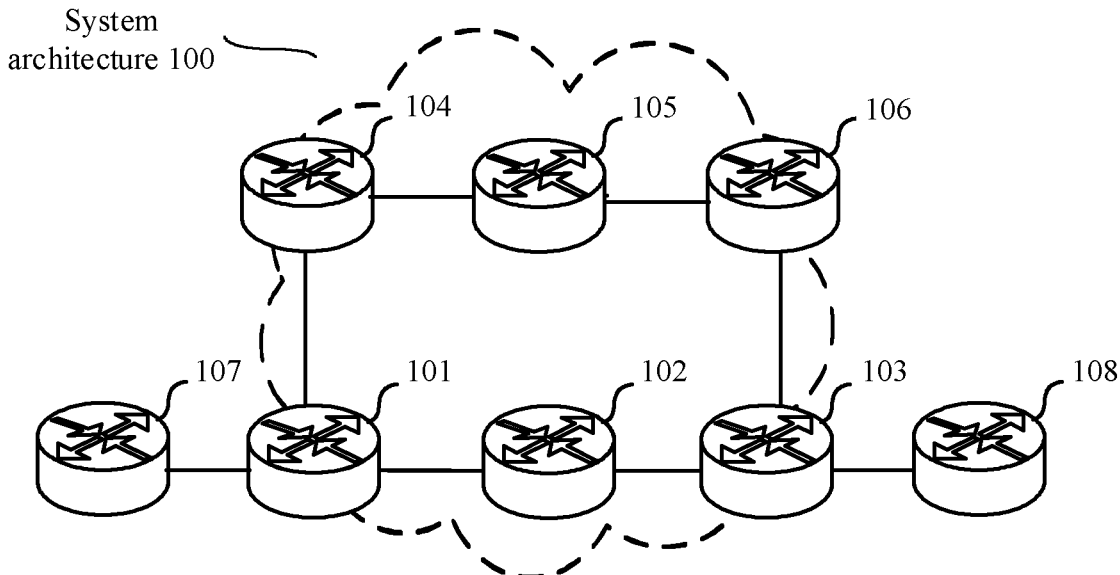
FIG. 1 is a schematic diagram of an application scenario of a method for packet transmission according to an embodiment of the present disclosure.

FIG. 1 is a schematic architectural diagram of a system for packet transmission in a network. The system is a possible application scenario implemented in this application. The network system 100 includes a node 101, a node 102, a node 103, a node 104, a node 105, and a node 106 that are in a segment routing (SR) network, and a node 107 and a node 108 that are outside the network. The node 101 is an ingress node in the network, and the node 103 is an egress node in the network. There are two paths for a packet from the node 101 to the node 103 a primary path and a secondary path. The node 101, the node 104, the node 105, and the node 106 are sequentially on the primary path. After arriving at the node 101 in the SR network, the packet arrives at the node 106 through the node 104 and the node 105 sequentially. The node 101, the node 102, the node 103, and the node 106 are sequentially on the secondary path. In a normal case, the primary path is used to forward a packet. When the node 105 on the primary path is faulty, the packet may be sent by the node 104 to the secondary path based on an IGP FRR technology. In an embodiment, the packet arrives at the node 106 through the node 101, the node 102, and the node 103 sequentially.

However, there may be a node on which a local forwarding policy is configured to guide packet forwarding. For example, in a forwarding policy configured on the node 101, a received packet is forwarded to the node 104 through a TE tunnel. In this case, if the node 105 is faulty, the node 104 sends the packet to the node 101 using the IGP FRR technology such that the packet can be forwarded through the secondary path. However, after receiving the packet sent by the node 104, the node 101 sends again the packet to the node 104 through the TE tunnel according to the local forwarding policy. Because the node 105 is faulty and cannot send the packet, after receiving the packet sent by the node 101, the node 104 continues to forward the packet to the node 101. Only when receiving a notification that the node 105 is faulty, the node 101 forwards the packet through the secondary path, instead of sending the packet to the node 101 through the TE tunnel again. On an actual link, there may be a long distance between the node 101 and the faulty node 105. A device, for example, the node 101 can be notified, in a relatively long time, of information indicating that the node 105 is faulty. However, the local forwarding policy, for example, a local policy such as the TE tunnel or policy-based routing may be configured on the node 101 such that the packet is preferably forwarded according to the local policy, and cannot be normally forwarded on the secondary path. As a result, a loop occurs.

To resolve the foregoing problem, this application provides a system for packet transmission in a network. The network may be an SR network. In the following, the system is described using the SR network as an example. The SR network includes an ingress node 101, an egress node 106, a node 104 and a node 105 on a primary path, and a node 102 and a node 103 on a secondary path.

The egress node 106 in the SR network publishes two different segment identifiers, and the segment identifiers may be Multi-Protocol Label Switching (MPLS) labels or IPv6 addresses. The following uses an example in which a label is an IPv6 address for description. For example, two different addresses published by the egress node 106 are A4::00 and C4::00, and the two addresses are flooded to another node in the SR network. The address C4::00 carries a strict SPF flag. In an embodiment, if the address C4::00 in a packet carries the strict SPF flag, the packet is forwarded through a packet forwarding path computed according to a strict SPF algorithm, and the local policy is no longer used to forwarding of the packet. The node 104 stores the received two different addresses.

When the packet is forwarded to the node 104 and it is determined that the node 105 on the primary path is faulty, the node 104 changes an address in the packet from original A4::00 to C4::00. Because the address C4::00 carries the strict SPF flag, the packet whose address is changed into C4::00 is forwarded according to a strict SPF algorithm. In an embodiment, the packet is sent to the egress node in the SR network through the secondary path, to avoid a loop during packet forwarding.

Figure 2:
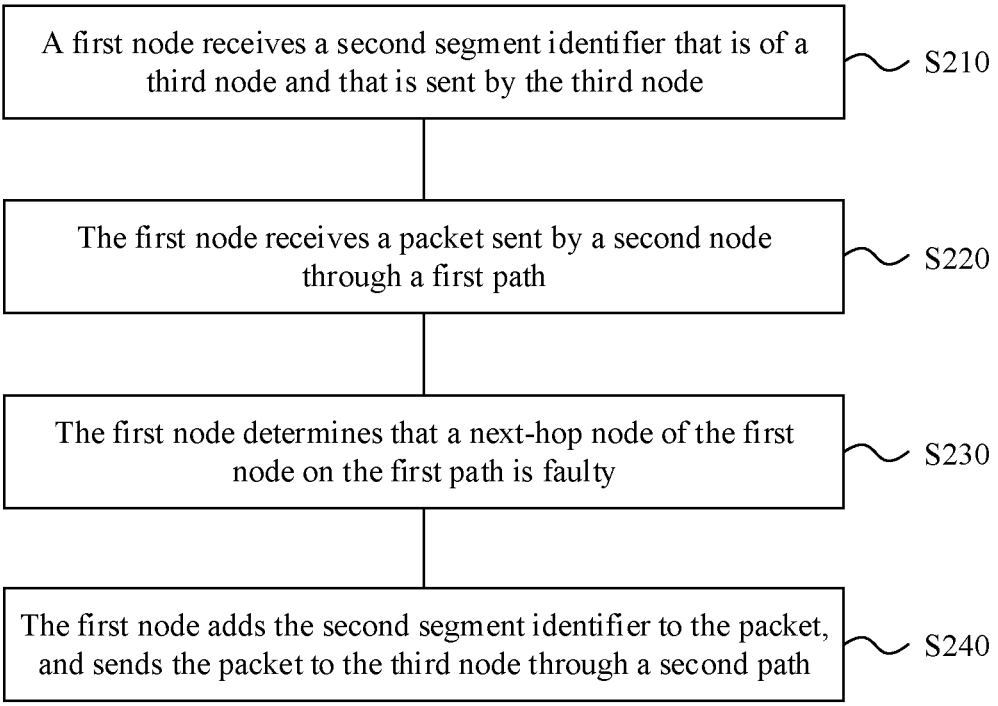
FIG. 2 is a schematic flowchart of a method for packet transmission in a network according to an embodiment of the present disclosure.

With reference to the application scenario shown in FIG. 1, the following uses FIG. 2 as an example to describe in detail a method for packet transmission performed by the node 104 in FIG. 1. FIG. 2 is a schematic flowchart of a method for packet transmission in a network according to this application. The method is applicable to an SR network, the node 104 in FIG. 1 is referred to as a first node in FIG. 2, and any node in FIG. 1 may perform steps in a method procedure in FIG. 2. The network includes the first node, a second node, and a third node, and the network may further include a node other than the first node, the second node, and the third node. For example, the network may further include a fourth node. A first path from the second node to the third node is established in the network, the first path is established based on a first segment identifier of the third node, and the first node is on the first path. The second node may be the ingress node 101 in FIG. 1, and the third node may be the egress node 103 in FIG. 1. The method includes the following steps.

S210. The first node receives a second segment identifier that is of the third node and that is sent by the third node.

In a possible implementation, the method is applicable to the SR network provided by an operator. An egress node in the SR network may obtain two labels using a Label Distribution Protocol (LDP) or a SR protocol, and both the two labels may be used to identify the third node. For example, the obtained two labels are respectively referred to as the first segment identifier and the second segment identifier.

In a possible implementation, the third node floods the generated first segment identifier and the generated second segment identifier to another node in the SR network using an open shortest-path first (OSPF) IGP or an intermediate system-to-intermediate system (IS-IS) intra-domain routing information exchange protocol. Both the first node and the second node in the network may receive the first segment identifier and the second segment identifier that are used to identify the third node. The second node in the network may establish, based on the first segment identifier, the first path for sending a packet to the egress node.

Optionally, the first segment identifier and the second segment identifier are IPv6 addresses of the third node.

In a possible implementation, if a first packet is an IPv6 packet, the first segment identifier and the second segment identifier may be two different addresses published by the egress node. For example, the two addresses are A4::00 and C4::00 respectively.

S220. The first node receives a packet sent by the second node through the first path, where an address of the packet is a segment identifier of a next-hop node of the first node.

In a possible implementation, the second node obtains, through computation based on the first segment identifier, the first path for forwarding the packet to the third node. The second node forwards the packet to the first node through the first path, and the first node receives the packet and forwards the packet based on a destination address that is of the next-hop node and that is carried in the packet.

In a possible implementation, the second node may be an ingress node in the SR network. The second node may add a segment identifier of a node on the first path to a packet header. The second node may establish a label stack based on the segment identifier of the node on the first path, and add the label stack to the packet header such that the packet is forwarded to the third node based on the label stack. A destination address of an outer layer of the packet is a segment identifier of a next-hop network device.

For example, the second node forwards the packet to the third node by sequentially using the first node on the first path and the next-hop node of the first node. For example, a segment identifier of the second node is A1::00, a segment identifier of the first node is A2::00, a segment identifier of the next-hop of the first node is A3::00, and a segment identifier of the third node is A4::00. The second node establishes one label stack based on the segment identifier of the node on the first path, and adds the label stack to the packet header. A specific adding manner may be adding the label stack to a SR header in the packet header. Label stacks added by the second node to the packet header include A2::00, A3::00, and A4::00, and a destination address of the packet is A2::00. The second node sends the packet to the first node. The first node receives the packet based on the destination address A2::00 of the packet, replaces the destination address A2::00 of the packet with A3::00 in the label stacks, and sends the packet to the next-hop of the first node based on the destination address A3::00 of the packet. Similarly, the next-hop of the first node receives the packet carrying the destination address A3::00, replaces the destination address with A4::00 in the label stacks, and sends the packet to the third node, to send the packet to the third node through the first path. The foregoing method for forwarding the packet through the first path is merely an example for description. The second node may alternatively forward the packet to the third node through the first path in another manner.

S230. The first node determines that the next-hop node of the first node on the first path is faulty.

In a possible implementation, when the next-hop node is faulty, another node including the first node in the network obtains, using the IS-IS protocol or the OSPF protocol, a message indicating that the next-hop node is faulty. Because the first node is adjacent to the next-hop node, the first node rapidly determines that the next-hop node is faulty.

S240. In response to that the first node determines that the next-hop node of the first node is faulty, the first node adds the second segment identifier to the packet, and sends the packet to the third node through a second path. The second path is established by the first node based on the second segment identifier.

In a possible implementation, when the next-hop node of the first node is faulty, the first node may establish the second path based on the second segment identifier, to send the packet to the third node.

For example, when the next-hop node of the first node is faulty and cannot forward the packet, the first node may add the second segment identifier to the destination address of the packet. In other words, the first node replaces the destination address of the packet with the second segment identifier such that the packet is sent to the third node through the second path established based on the second segment identifier.

Optionally, the second segment identifier includes a path computation identifier, and the path computation identifier is used to instruct the first node to establish the second path according to a SPF algorithm.

In a possible implementation, the second segment identifier carries the path computation identifier, for example, carries a strict SPF flag. According to a strict SPF algorithm, a packet forwarding path is determined according to the SPF algorithm. However, according to the strict SPF algorithm, all nodes in the SR network need to determine the packet forwarding path according to the strict SPF algorithm, and applicability of a local policy is excluded. In an embodiment, if a use priority of the local policy such as an SR TE tunnel or a configured routing policy is lower than that of a requirement of computing a path according to the strict SPF algorithm, the strict SPF algorithm is preferably used to compute the second path. The local policy is a local routing and forwarding policy that needs to be preferably processed, such as the SR TE tunnel or a local routing policy. For example, before the second node in the SR network forwards the packet, the SR TE tunnel is configured for the second node such that the second node preferably forwards the packet to the first node through the configured SR TE tunnel, instead of sending the packet to the next-hop node through a path computed by the second node. Although both the second segment identifier and the first segment identifier are used to identify the egress node in the SR network, the second segment identifier is different from the first segment identifier, and the first segment identifier does not carry the strict SPF identifier. The first node preferably computes a secondary path based on the second segment identifier according to the strict SPF algorithm. In this case, the first node preferably computes and establishes the second path according to the SPF algorithm, and sends the packet to the egress node through the second path, to avoid a loop.

For example, when the first node determines that the next-hop of the first node is faulty, the first node adds the second segment identifier C4::00 of the third node to the destination address of the packet, and the second segment identifier C4::00 carries the strict SPF flag. The first node establishes the second path based on the destination address C4::00 in the packet according to the SPF algorithm, and sends the packet to the third node through the second path.

Optionally, the second path is established by the first node when the first node determines that the next-hop node of the first node on the first path is faulty.

Optionally, that the first node adds the second segment identifier to the packet includes. The first node replaces the address of the packet with the second segment identifier.

In a possible implementation, when determining that a next-hop network device of the first node is faulty, the first node replaces the address of the packet with the second segment identifier, and forwards the packet based on the replaced address.

Figure 3:
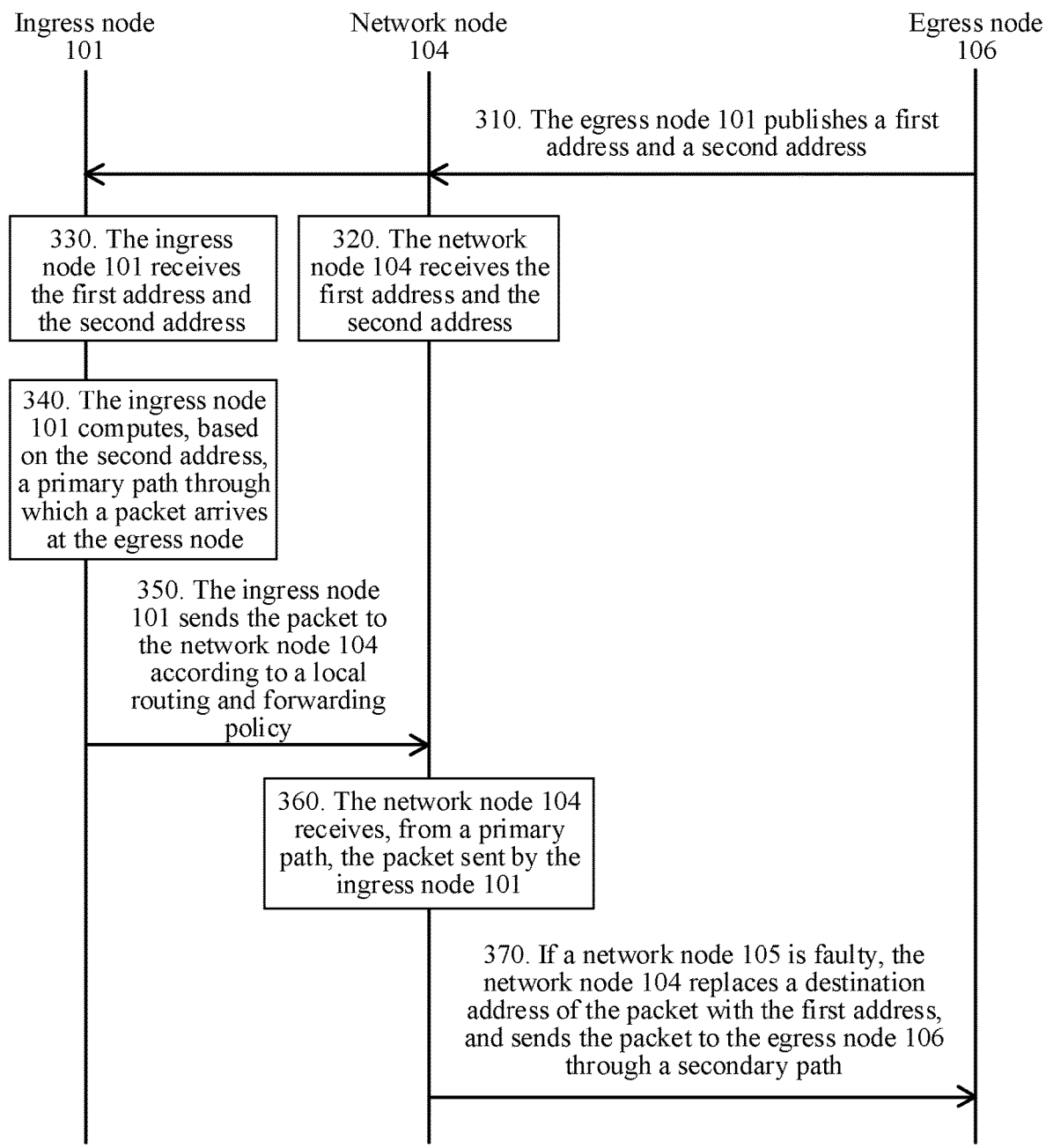
FIG. 3 is a schematic flowchart of another method for packet transmission in a network according to an embodiment of the present disclosure.

An SR network in which an IPv6 packet is forwarded in a loop-free alternate (LFA) scenario in which a local forwarding policy is configured is used below as an example. With reference to the network system shown in FIG. 1, the following further provides a schematic flowchart of a method for packet transmission in a network according to this application. A method performed by a node 104 in FIG. 3 may be applied to the first node in FIG. 2, and a method performed by a node 105 in FIG. 3 may be applied to the next-hop node of the first node in FIG. 2. A method performed by a node 101 in FIG. 3 may be applied to the ingress node in FIG. 2, and a method performed by the node 106 in FIG. 3 may be applied to the egress node in FIG. 2. In FIG. 3, the node 101 is adjacent to the node 104, and the node 104 is adjacent to the node 105. The method includes the following steps.

S310. The egress node 101 publishes a first address and a second address, where the first address carries a strict SPF flag.

For example, an egress node in the SR network publishes two different addresses of the egress node using an IS-IS protocol or an OSPF protocol, and the two different addresses of the egress node are C4::00 and A4::00 respectively. C4::00 carries the strict SPF flag, and details are shown in FIG. 4 and FIG. 5. FIG. 4 and FIG. 5 merely provide an example implementation, and do not constitute any limitation on this application. In the IS-IS protocol in FIG. 4, that a reserved field in a flag field in FIG. 5 is set to 1 indicates that is a path that needs to be computed according to a strict SPF, and that the reserved field is set to 0 indicates that the path does not need to be computed according to the strict SPF. When the reserved field is set to 1, a packet is forwarded without using a local forwarding policy, and a packet forwarding path is computed according to the strict SPF algorithm.

S320. The network node 104 receives the first address and the second address.

For example, a node may receive, using the IS-IS protocol or the OSPF protocol, the two different addresses C4::00 and A4::00 published by the egress node 106, and the address C4::00 carries the strict SPF flag. After receiving the two addresses, the network node 104 stores the two addresses.

S330. The ingress node 101 receives the first address and the second address.

S340. The ingress node 101 computes, based on the second address, a primary path through which the packet arrives at the egress node.

For example, when the packet enters the SR network, the ingress node 101 may compute the packet forwarding path based on the second address of the egress node 106, for example, A4::00, using a node label manner or a link label manner, allocate a label to the packet, and send the packet to the egress node 106. The node label manner is used as an example. When receiving a packet, the ingress node 101 computes, based on the second address A4::00, the primary path through which the packet arrives at the egress node 103, and adds, to the packet, a label indicating that the packet is to arrive at the egress node 106. A feature of the node label is that the packet forwarding path may be computed according to the SPF algorithm or another algorithm provided that the packet can arrive at the egress node 106.

S350. The ingress node 101 sends the packet to the network node 104 according to a local routing and forwarding policy.

For example, the ingress node 101 may compute the packet forwarding path based on the second address of the egress node 106, and send the packet to the egress node 106. However, if the local forwarding policy is configured on one or more nodes on the primary path, for example, an SR TE tunnel is configured between the ingress node 101 and the network node 104, when receiving the packet, the ingress node 101 preferably forwards the packet to the network node 104 through the SR TE tunnel. In this way, the ingress node 101 on which the local forwarding policy is configured preferably forwards the packet to the network node 104 through the SR TE tunnel.

S360. The network node 104 receives, from the primary path, the packet sent by the ingress node 101, where a destination address of the packet is a segment identifier of the node 105.

For example, a next-hop node of the network node 104 is the node 105, and a destination address of the packet sent by the network node 104 to the next-hop sending node 105 is the segment identifier of the node 105.

S370. If the node 105 is faulty, the network node 104 replaces the destination address of the packet with the first address, and sends the packet to the egress node 106 through a secondary path.

For example, the node 105 may notify, using the IS-IS protocol or the OSPF protocol, another node in the SR network that the node 105 is faulty. The network node 104 obtains a message indicating that the node 105 is faulty, replaces the destination address A4::00 of the received packet with C4::00, and C4::00 carries the strict SPF flag. Therefore, the network node 104 should send the packet to the egress node 106 through the secondary path established according to the strict SPF algorithm. According to the foregoing method, a loop is avoided during packet forwarding.

Figure 6:
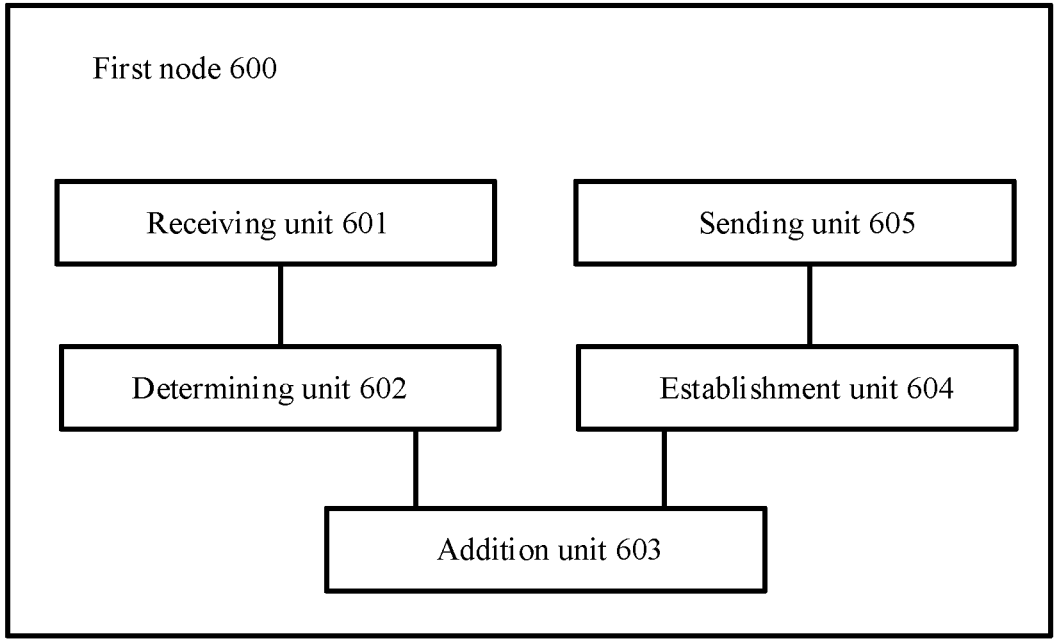
FIG. 6 is a schematic structural diagram of a node for packet transmission according to an embodiment of the present disclosure.

FIG. 6 shows a first node 600 for transmission in a network according to this application. The network includes the first node 600, a second node, and a third node. A first path from the second node to the third node is established in the network, the first path is established based on a first segment identifier of the third node, and the first node 600 is on the first path. The first node may be any node on the primary path and the secondary path in FIG. 1, or may be the first node in FIG. 2 and FIG. 3. The node includes a receiving unit 601, a determining unit 602, an addition unit 603, an establishment unit 604, and a sending unit 605.

The receiving unit 601 is configured to receive a second segment identifier that is of the third node and that is sent by the third node, and is further configured to receive a packet sent by the second node through the first path. An address of the packet is a segment identifier of a next-hop node of the first node.

The determining unit 602 is configured to determine that the next-hop node of the first node on the first path is faulty.

The addition unit 603 is configured to add the second segment identifier to the packet in response to that the determining unit 602 determines that the next-hop node of the first node is faulty.

The establishment unit 604 is configured to establish a second path based on the second segment identifier received by the receiving unit 601.

The sending unit 605 is configured to send the packet to the third node through the second path established by the establishment unit 604.

In a possible implementation, the receiving unit 601 of the first node and an ingress node receive the first segment identifier and the second segment identifier that are used to identify an egress node. The ingress node establishes, based on the first identifier, the first path for sending the packet to the egress node. The ingress node forwards the packet to the first node through the first path, and the receiving unit 601 of the first node receives the packet and forwards the packet based on the segment identifier that is of the next-hop node and that is carried in the packet. When the determining unit 602 of the first node determines that a next-hop network device of the first node is faulty, the addition unit 603 of the first node adds the second identifier to a destination address of the packet. The establishment unit 604 of the first node establishes the second path, and the sending unit 605 of the first node sends the packet to the egress node through the second path established by the establishment unit 604.

Optionally, the second segment identifier includes a path computation identifier, and the path computation identifier is used to instruct the first node to establish the second path according to a SPF algorithm.

In a possible implementation, the second segment identifier carries the path computation identifier, for example, carries a strict SPF flag. According to a strict SPF algorithm, a packet forwarding path is also determined according to the SPF algorithm. However, according to the strict SPF algorithm, all nodes in an SR network need to determine a packet sending path according to the strict SPF algorithm, and applicability of a local policy is excluded. In an embodiment, if a use priority of the local policy such as an SR TE tunnel or a configured routing policy is lower than that of a requirement of computing a path according to the strict SPF algorithm, the SPF algorithm is preferably used to establish the second path.

Optionally, the establishment unit 604 is configured to establish the second path when the determining unit 602 determines that the next-hop node of the first node on the first path is faulty, or establish the second path before the determining unit 602 determines that the next-hop node of the first node on the first path is faulty.

Optionally, that the addition unit 603 adds the second segment identifier to the packet includes. The addition unit 603 replaces the destination address of the packet with the second segment identifier.

Optionally, the second segment identifier includes the path computation identifier, and the path computation identifier is used to instruct the first node to establish the second path according to the SPF algorithm.

Optionally, the first segment identifier and the second segment identifier are IPv6 addresses of the third node.

In the specific implementation, for specific implementations of the receiving unit 601, the determining unit 602, the addition unit 603, the establishment unit 604, and the sending unit 605, refer to functions and implementation steps of the first node that are described in FIG. 2 and FIG. 3. For brevity, details are not described again.

Figure 7:
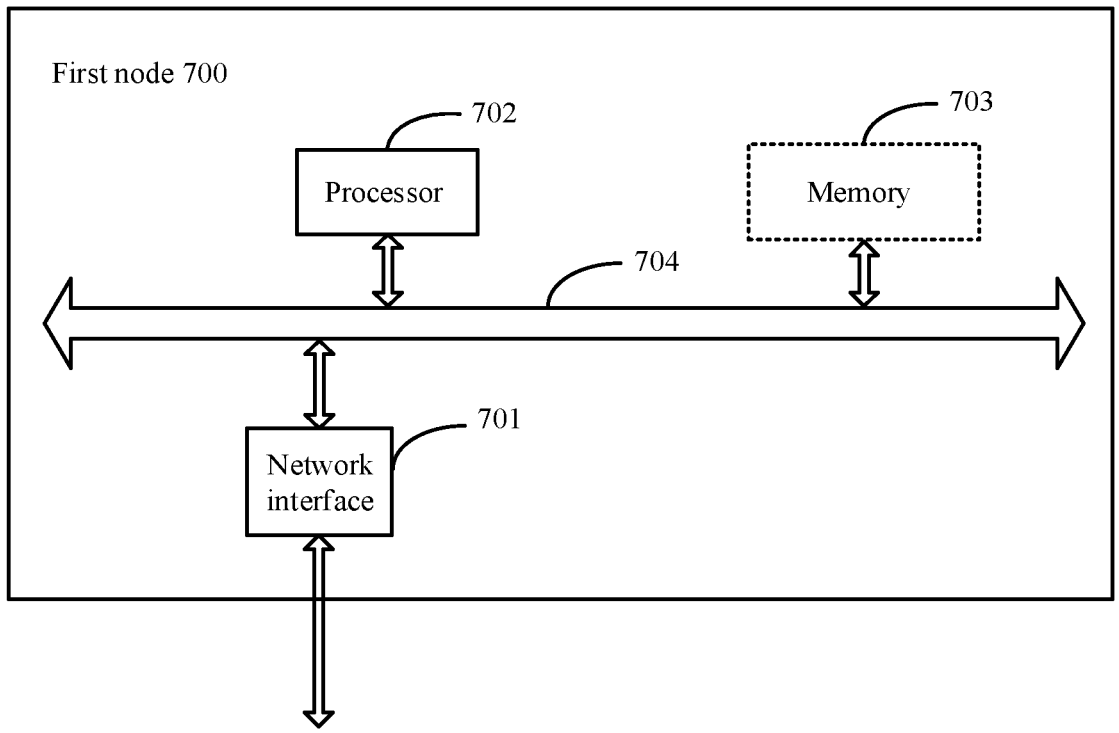
FIG. 7 is a schematic structural diagram of another node for packet transmission according to an embodiment of the present disclosure.

For example, FIG. 7 is a hardware construction diagram of another first node 700 according to this application. The first node includes a network interface 701 and a processor 702, and may further include a memory 703.

The network interface 701 may be a wired interface, for example, a Fiber Distributed Data Interface (FDDI), or an Ethernet interface.

The processor 702 includes but is not limited to one or more of a central processing unit (CPU), a network processor (NP), an application-specific integrated circuit (ASIC), and a programmable logic device (PLD). The PLD may be a complex programmable logic device (CPLD), a field programmable gate array (FPGA), generic array logic (GAL), or any combination thereof. The processor 702 is responsible for managing a bus 704 and general processing, and may further provide various functions, including timing, a peripheral interface, voltage regulation, power management, and another control function. The memory 703 may be configured to store data used by the processor 702 when the processor 702 performs an operation.

The memory 703 may include but is not limited to a content-addressable memory (CAM), for example, a ternary content-addressable memory (TCAM) or a random access memory (RAM).

The memory 703 may alternatively be integrated in the processor 702. If the memory 703 and the processor 702 are mutually independent components, the memory 703 is connected to the processor 702. For example, the memory 703 and the processor 702 may communicate with each other using the bus. The network interface 701 may communicate with the processor 702 using the bus, or the network interface 701 may be directly connected to the processor 702.

The bus 704 may include any quantity of interconnected buses and bridges, and the bus 704 links together one or more processors represented by the processor 702 and various circuits of a memory represented by the memory 703. The bus 704 may further link together various other circuits, such as a peripheral device, a voltage stabilizer, and a power management circuit. These are all well known in the art. Therefore, no further description is provided in this specification.

In a possible implementation, the network includes the first node, a second node, and a third node. A first path from the second node to the third node is established in the network, the first path is established based on a first segment identifier of the third node, and the first node is on the first path. The first node includes the network interface 701 and the processor 702.

The network interface 701 is configured to receive a second segment identifier that is of the third node and that is sent by the third node.

The network interface 701 is configured to receive a packet sent by the second node through the first path, and an address of the packet is a segment identifier of a next-hop node of the first node.

The processor 702 is configured to determine that the next-hop node of the first node on the first path is faulty.

In response to that the first node determines that the next-hop node of the first node is faulty, the processor 702 adds the second segment identifier to the packet, and sends the packet to the third node through a second path. The second path is established by the first node based on the second segment identifier.

Optionally, the processor 702 establishes the second path when the first node determines that the next-hop node of the first node on the first path is faulty, or the second path is established by the first node before the first node determines that the next-hop node of the first node on the first path is faulty.

Optionally, when determining that the next-hop node of the first node on the first path is faulty, the processor 702 replaces a destination address of the packet with the second segment identifier.

Optionally, the second segment identifier includes a path computation identifier, and the path computation identifier is used to instruct the first node to establish the second path according to a SPF algorithm.

Optionally, the first segment identifier and the second segment identifier are IPv6 addresses of the third node.

In the specific implementation, for specific implementations of the processor 702 and the network interface 701, refer to the functions and implementations of the first node that are described in FIG. 2 and FIG. 3. For brevity, details are not described again.

Figure 8:
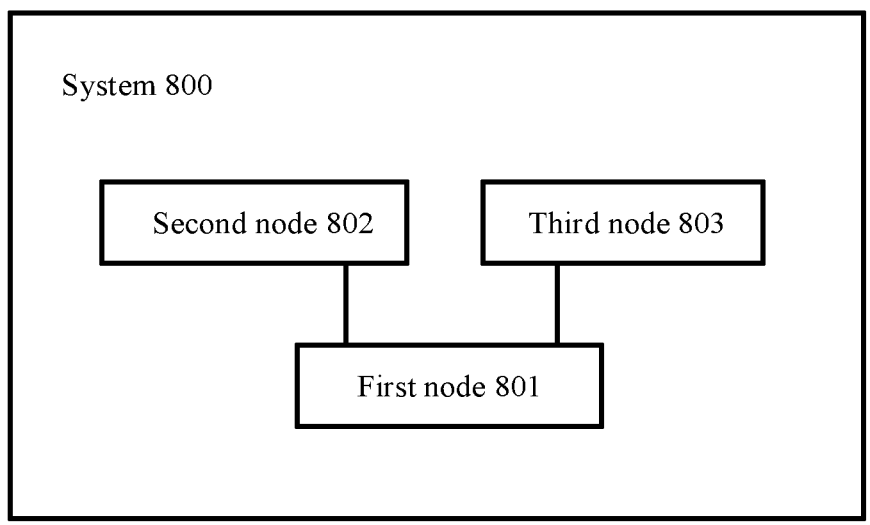
FIG. 8 is a schematic structural diagram of a system for packet transmission in a network according to an embodiment of the present disclosure.

FIG. 8 shows a system for packet transmission in a network according to this application. The system includes a first node 801, a second node 802, and a third node 803.

The first node 801 may be the network node 104 in FIG. 1, or may be the first node in the method flowcharts shown in FIG. 2 and FIG. 3, and may implement functions of the first node that are described in FIG. 2 and FIG. 3, or may be the first node in FIG. 6 or FIG. 7.

The first node 801 is configured to receive a second segment identifier that is of the third node and that is sent by the third node, and is further configured to receive a packet sent by the second node through a first path. The first node is further configured to determine that a next-hop node of the first node on the first path is faulty, and in response to that the first node determines that a next-hop node of the first node on the first path is faulty, add the second segment identifier to the packet, establish a second path based on the second segment identifier, and send the packet to the third node through the second path. An address of the packet is a segment identifier of the next-hop segment node of the first node.

The second node 802 is configured to receive a first segment identifier of the third node, establish the first path from the second node to the third node based on the first segment identifier, and send the packet to the first node through the first path.

The third node 803 is configured to send the first segment identifier to the first node, send the second segment identifier to the second node, and receive the packet sent by the first node through the second path.

Optionally, the second path is established by the first node when the first node determines that the next-hop node of the first node on the first path is faulty, or the second path is established by the first node before the first node determines that the next-hop node of the first node on the first path is faulty.

Optionally, that the first node adds the second segment identifier to the packet includes. The first node replaces a destination address of the packet with the second segment identifier.

Optionally, the second segment identifier includes a path computation identifier, and the path computation identifier is used to instruct the first node to establish the second path according to a SPF algorithm.

Optionally, the first segment identifier and the second segment identifier are IPv6 addresses of the third node.

In the specific implementation, for a specific implementation of the first node 801, refer to functions and implementation steps of the first node that are described in FIG. 2 and FIG. 3. For brevity, details are not described again.

It should be understood that sequence numbers of the foregoing method do not mean execution sequences in various embodiments of this application. The execution sequences of the method should be determined based on functions and internal logic of the processes, and should not constitute any limitation on the implementation processes of the embodiments of this application.

In the several embodiments provided in this application, it should be understood that the disclosed method and device may be implemented in another manner. For example, the described apparatus embodiment is merely an example. For example, the module division is merely logical function division and may have another division manner in actual implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or another form.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions in the embodiments.

In addition, function modules in the embodiments of the present disclosure may be integrated into one processing unit, or each of the modules may exist alone physically, or two or more modules are integrated into one unit. The integrated module may be implemented in a form of hardware, or may be implemented in a form of hardware in addition to a software function unit.

When the integrated unit is implemented in a form of hardware in combination with software, and is sold or used as an independent product, the software may be stored in a computer readable storage medium. Based on such an understanding, in the technical solutions of the present disclosure, some technical features contributing to another approach may be implemented in a form of a software product. The computer software product is stored in a storage medium, and includes some instructions for instructing a computer device (which may be a personal computer, a server, a network device, a node, or the like) to perform all or some of the steps of the methods described in the embodiments of the present disclosure. The storage medium may be a USB flash disk, a removable hard disk, a read-only memory (ROM), a RAM, a magnetic disk, or a compact disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a first node in a network, wherein the method comprises:
   receiving, from a second node in the network, a packet destined for a third node in the network, wherein the packet is an Internet Protocol version 6 (IPv6) packet;
   making a determination that a first path from the second node to the third node is faulty, wherein the first path is based on a first segment identifier;
   adding, in response to the determination, a second segment identifier to the packet to obtain a modified packet, wherein the second segment identifier is a Segment Routing over IPv6 (SRv6) segment identifier (SID), wherein the SRv6 SID instructs the modified packet to be forwarded through a new path computed according to a strict shortest path first (SPF) algorithm, and wherein the SRv6 SID corresponds to an SPF flag; and
   sending, to the third node through a second path, the modified packet.

2. The method of claim 1, further comprising determining the second path when a next-hop node of the first node on the first path is faulty.

3. The method of claim 1, further comprising determining the second path before a next-hop node of the first node on the first path becomes faulty.

4. The method of claim 1, wherein adding the second segment identifier to the packet comprises replacing a destination address of the packet with the second segment identifier.

5. The method of claim 1, wherein the second segment identifier comprises a path computation identifier.

6. The method of claim 5, wherein the path computation identifier instructs the first node to determine the second path according to the SPF algorithm.

7. The method of claim 1, wherein the SPF flag instructs the modified packet to be forwarded through the new path computed according to the strict SPF algorithm.

8. A first node in a network and comprising:
   a memory configured to store a computer program instruction; and
   one or more processors coupled to the memory and configured to execute the computer program instruction to cause the first node to:
      receive, from a second node in the network, a packet destined for a third node in the network, wherein the packet is an Internet Protocol version 6 (IPv6) packet;
      make a determination that a first path from the second node to the third node is faulty, wherein the first path is based on a first segment identifier;
      add, in response to the determination, a second segment identifier to the packet to obtain a modified packet, wherein the second segment identifier is a Segment Routing over IPv6 (SRv6) segment identifier (SID), wherein the SRv6 SID instructs the modified packet to be forwarded through a new path computed according to a strict SPF algorithm, and wherein the SRv6 SID corresponds to an SPF flag; and
      send, to the third node through a second path, the modified packet.

9. The first node of claim 8, wherein the one or more processors are further configured to execute the computer program instruction to cause the first node to determine the second path when a next-hop node of the first node on the first path is faulty.

10. The first node of claim 8, wherein the one or more processors are further configured to execute the computer program instruction to cause the first node to determine the second path before a next-hop node of the first node on the first path becomes faulty.

11. The first node of claim 8, wherein the one or more processors further configured to execute the computer program instruction to cause the first node to add the second segment identifier to the packet by replacing a destination address of the packet with the second segment identifier.

12. The first node of claim 8, wherein the second segment identifier comprises a path computation identifier.

13. The first node of claim 12, wherein the path computation identifier instructs the first node to determine the second path according to the SPF algorithm.

14. The first node of claim 8, wherein the SPF flag instructs the modified packet to be forwarded through the new path computed according to the strict SPF algorithm.

15. A second node in a network and comprising:
a memory configured to store a computer program instruction; and
one or more processors coupled to the memory and configured to execute the computer program instruction to cause the second node to:
receive an Internet Protocol version 6 (IPv6) packet comprising a second segment identifier, wherein the second segment identifier is a Segment Routing over IPv6 (SRv6) segment identifier (SID), wherein, the SRv6 SID instructs the IPv6 packet to be forwarded through a path computed according to a strict shortest path first (SPF) algorithm, and wherein the SRv6 SID corresponds to an SPF flag;
determine a first path according to the SRv6 SID; and
forward the IPv6 packet through the first path.

16. The second node of claim 15, wherein the one or more processors are further configured to execute the computer program instruction to cause the second node to further forward the IPv6 packet without using a local policy.

17. The second node of claim 15, wherein the SRv6 SID is included in an SID list of the IPv6 packet.

18. The second node of claim 15, wherein the first path is from the second node to a third node in the network.

19. The second node of claim 18, wherein the first path comprises a first node that is in the network and that is between the second node and the third node.

20. The second node of claim 15, wherein the IPv6 packet further comprises a type field, a length field, an SID size field, a sub-type-length-value length (sub-TLV-len) field, and sub-type-length-value (sub-TLV) field.

* * * * *